United States Patent [19]

Regueiro

[11] Patent Number: 5,261,366
[45] Date of Patent: Nov. 16, 1993

[54] METHOD OF FUEL INJECTION RATE CONTROL

[75] Inventor: José F. Regueiro, Rochester Hills, Mich.

[73] Assignee: Chrysler Corporation, Highland Park, Mich.

[21] Appl. No.: 28,004

[22] Filed: Mar. 8, 1993

[51] Int. Cl.$^5$ .................................. F02D 41/40
[52] U.S. Cl. ................................. 123/299; 123/478
[58] Field of Search ............... 123/294, 299, 300, 478, 123/480

[56] References Cited

U.S. PATENT DOCUMENTS

| | | | |
|---|---|---|---|
| 4,757,795 | 7/1988 | Kelly | 123/506 |
| 4,955,339 | 9/1990 | Sasaki et al. | 123/300 X |
| 4,966,119 | 10/1990 | Mitsuyasu et al. | 123/300 X |
| 5,003,944 | 4/1991 | Moote et al. | 123/299 |
| 5,078,107 | 1/1992 | Morikawa | 123/299 X |
| 5,090,379 | 2/1992 | Ito | 123/299 |
| 5,101,785 | 4/1992 | Ito | 123/299 X |
| 5,127,378 | 7/1992 | Ito | 123/300 |
| 5,137,000 | 8/1992 | Stepper et al. | 123/478 |

OTHER PUBLICATIONS

*The Internal Combustion Engine In Theory And Practice*, vol. 2: "Combustion, Fuels, Material, Design" (Rev. Ed. Jan. 1985), MIT Press, pp. 214–219.
*Diesel Engine Catalog,* "Cummins", Diesel Progress, Jan. 1955, pp. 228–235.
*Diesel Engine Catalog,* "Cooper-Bessemer", vol. 13, Jan. 1948, pp. 67–79.
*SAE Technical Paper Series,* "Injection Timing and Rate Control — A Solution for Low Emissions", SAE International, Feb. 26–Mar. 2, 1990, pp. 1–10, Needham et al.

Primary Examiner—Willis R. Wolfe
Attorney, Agent, or Firm—Kenneth H. MacLean

[57] ABSTRACT

A method is disclosed for varying the rate of injection of fuel during a single injection of fuel into a cylinder of an internal combustion engine. The method includes the steps of supplying pressurized fuel to the fuel inlet of an electrically controlled fuel injector and switching the fuel injector alternately on and off at a predetermined rate to thereby control the average rate of discharge of fuel from the fuel injector. The fuel injector can be a solenoid operated injector in which case the rate of discharge of fuel from the fuel injector can be controlled by modulating the width and frequency of pulses used to switch the fuel injector on and off.

5 Claims, 4 Drawing Sheets

METHOD OF FUEL INJECTION RATE CONTROL

TECHNICAL FIELD

The present invention relates generally to electronic fuel injection systems for internal combustion engines and, in particular, to an electronically controlled injection system which utilizes electronically controlled fuel injectors.

BACKGROUND OF THE INVENTION

With the continuing drive for improved engine performance, fuel consumption, and exhaust emissions, it is becoming increasingly important to precisely control the timing and quantity of fuel injected into the cylinder for combustion in the combustion chamber formed therein. In electronically controlled fuel injection systems, injection can be easily timed with respect to the piston top dead center position for all conditions of speed and load. The duration of injection is determined in terms of crankshaft degrees and, for any given fuel pressure, is varied to change the quantity of fuel injected into the combustion chamber for each combustion cycle.

Optimizing engine performance and emissions requires that injection occur over a certain number of crankshaft degrees, which will vary depending on engine speed, load, and other conditions. However, because of system inadequacies inherent in known diesel and stratified charge engines, the quantity of fuel required necessitates that the duration of injection be greater than the optimum number of crankshaft degrees. Thus, injection has traditionally been advanced or retarded and extended to run longer than the optimum number of crankshaft degrees. However, when injection is begun too early in the combustion process, several problems result. For a stratified charge engine, the combustion process begins to change its fundamental characteristics, behaving more like a homogenous-mixture engine and losing the benefits of stratification. For diesels, too much fuel will be present when combustion begins and will result in the "knocking" often associated with diesel engines. Additionally, the fuel droplets will tend to agglomerate to form larger fuel droplets and too much fuel will be deposited on (i.e., wet) the cylinder walls, resulting in poor combustion and increased emissions. On the other hand, if injection is extended to run too late in the combustion cycle, the fuel at the tail end of injection will not have the time needed to properly mix and burn, resulting in smoke-limited output, high fuel consumption, injection rate for both low and high engine speeds at both low and high energy losses to the exhaust and engine coolant. These situations become worse at higher engine speeds because the time it takes to rotate through the optimum number of crankshaft degrees becomes less.

To properly accommodate those particular conditions of speed, load, and other factors that require large quantities of fuel without sacrificing the optimum timing and duration of injection, fuel injection systems have been developed which vary the pressure of the fuel to thereby vary the rate at which fuel enters the chamber. One such system is commonly referred to as the Cummins PT system and is described in *Diesel Engine Catalogue*, Vol. 20, 1955. The Cummins PT systems uses a low pressure common rail with camshaft-driven injectors generating the high pressure. The low pressure is controlled by a throttle to thereby adjust the amount of fuel filling the injectors and, therefore, the quantity of fuel injected into the cylinders.

A second type of system which provides control of the pressure of the fuel being injected into the chamber is disclosed U.S. Pat. No. 4,757,795, issued Jul. 19, 1988 to W. W. Kelly. That system utilizes what is commonly referred to as a rotary type distributor pump. Fuel is supplied at low pressure to the distributor pump, which pressurizes the fuel using cam-driven plungers. The high pressure fuel is supplied via a fuel distributor rotor to an outlet that feeds the fuel to one of the fuel injectors. Like the Cummins PT system, this system utilizes a low pressure fuel supply with the high pressure being generated individually for each injector.

A third type of system uses in-line or jerk-type pumps. Fuel injection systems using these types pumps have one pump per fuel injector. These pumps are camshaft-driven reciprocating-displacement pumps supplied with fuel from a low pressure fuel supply. Each pump produces a high pressure charge of fuel that is supplied to its associated hydraulic injector.

Yet a fourth such system is commonly known as the Cooper-Bessemer system and has been used in marine and large industrial applications. That system utilizes piston pumping elements to generate high pressure in a common rail. A pressure regulating valve that is controlled in accordance with speed and load is used to vary the pressure from about 3,200 to 13,600 psi. Fuel is gated from the common rail to the injectors by fuel doors. The fuel doors are cam-driven check valves that permit control of the timing and quantity of fuel provided to its associated injector. The Cooper-Bessemer system is described in *Diesel Engine Catalogue*, Vol. 13, 1948.

None of the aforementioned fuel injection systems provide complete and independent control of the pressure, timing, and duration of injection which is necessary for achieving optimum engine performance and emissions control. Although the Cooper-Bessemer system permits control of both the timing and duration of injection, it does not permit them to be independently controlled. That is, advancement of the beginning of injection is necessarily accompanied by lengthening of the duration of injection. Moreover, the Cooper-Bessemer system involves a length of fuel line running between the fuel doors and the injectors. These lengths of fuel line reduce the amount of spill control and introduce sonic disturbances resulting from the fluid dynamics of the fuel flowing in the lines.

Other than simply controlling the rate of injection (i.e., pressure) from one injection event to another, it is also desirable to be able to vary the injection rate over the course of a single injection. In the jerk-type pumps noted above, this is done by designing the profile of the cam in accordance with the desired injection rate profile. A rough form of controlling the injection rate has also been done by pilot injection. For example, pilot injection has been accomplished using a large piezoelectric stack to generate the pressure needed to pump the fuel through the hydraulic injectors and into the cylinder. The piezoelectric stack was given an initial pulse to inject a small quantity of fuel and, after a small delay time, once autoignition of the fuel was imminent, was again operated to ram fuel into the cylinder for combustion. However, this pilot injection system required an impracticably large piezoelectric stack and only provided an initial pulse of fuel rather than a controlled rate of injection.

SUMMARY OF THE INVENTION

In accordance with the present invention, a method is provided for controlling the rate of injection of fuel from an electronically controlled fuel injector. The method includes the steps of supplying pressurized fuel to the fuel inlet of an electronically controlled fuel injector and switching the fuel injector alternately on and off at a predetermined rate to thereby control the average rate of discharge of fuel from the fuel injector. Preferably, the fuel injector is a solenoid operated hydraulic injector responsive to an electrical signal and is switched on and off by a controller sending electrical pulses to the fuel injector with the on-time of the injector being determined by the width of the pulse and the off-time of the injector being determined by the length of time between the pulses. Preferably, the off-time of the solenoid is short enough that the injector provides a continuous flow of fuel into the cylinder.

BRIEF DESCRIPTION OF THE DRAWINGS

The preferred exemplary embodiments of the present invention will hereinafter be described in conjunction with the appended drawings, wherein like designations denote like elements, and.

DESCRIPTION OF THE PREFERRED EMBODIMENT

Figure 1:
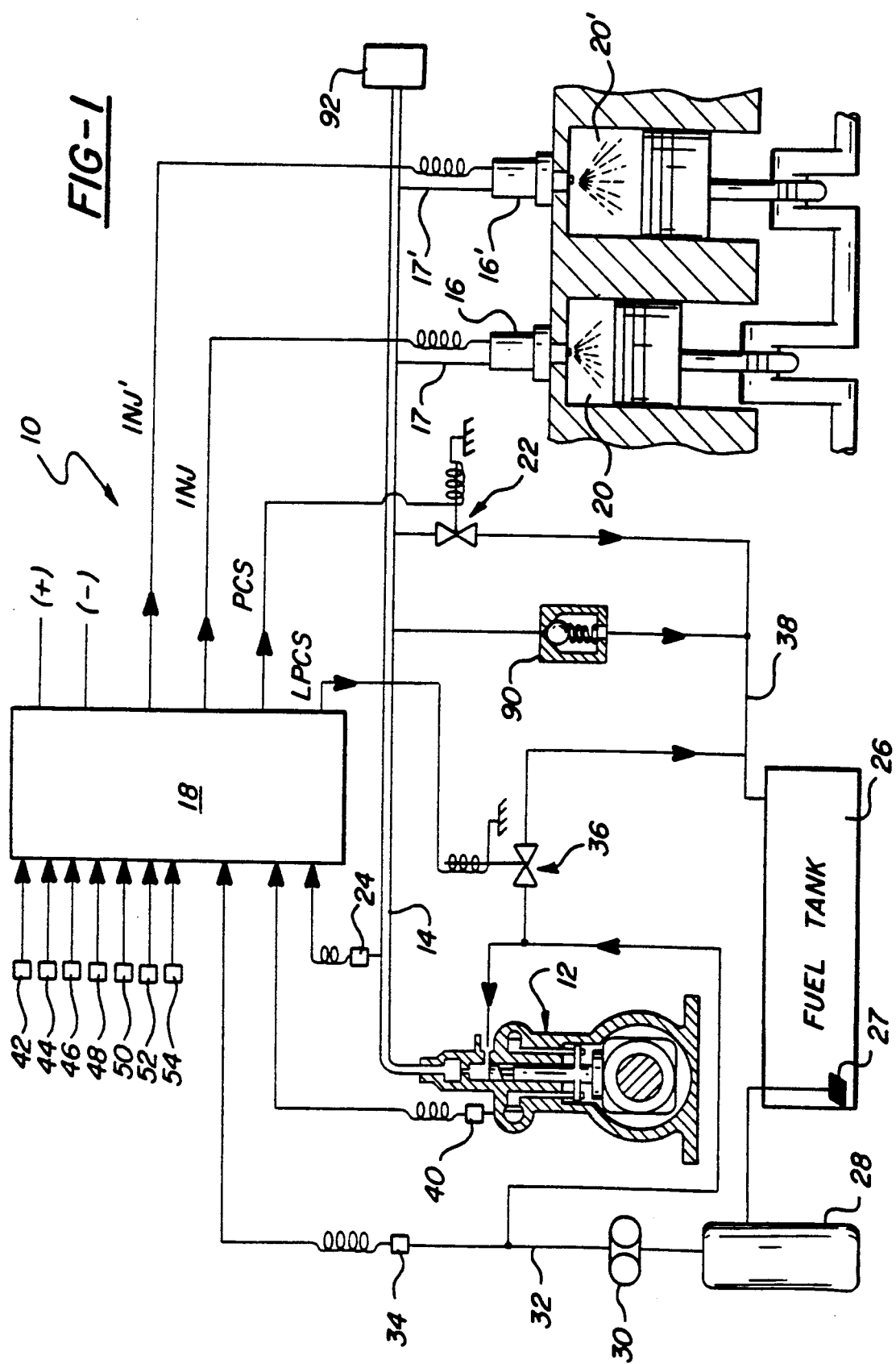
FIG. 1 is a schematic view of a high pressure fuel injection system suitable for practicing the method of the present invention.

Referring to FIG. 1, a fuel injection system designated generally as 10 includes a high pressure pump 12 connected to provide fuel to a common fuel rail 14. A pair of injectors 16 and 16' are connected to common rail 14 via injector lines 17 and 17', respectively. Injectors 16 and 16' are controlled by an electronic control unit (ECU) 18 to supply fuel into cylinders 20 and 20', respectively. Although two injectors are shown, it will of course be understood that more injectors can be connected to common rail 14, as the total number of injectors will typically be four, six, or eight, depending on the number of cylinders contained within the engine. The pressure of fuel in common rail 14 is controlled by a pressure regulator 22 and is monitored by a pressure sensor 24, both of which are connected to ECU 18.

Operation of fuel injection system 10 can be briefly described as follows. High pressure pump 12 pressurizes common rail 14. ECU 18 operates under program control to adjust the pressure of fuel in common rail 14 via pressure regulator 22 and to control the timing and duration of injection via fuel injectors 16 and 16'. The fuel pressure and the timing (i.e., beginning) and duration of injection are determined by ECU 18 in accordance with a multiplicity of inputs from various engine sensors. The most important among these are engine speed, load, and crankshaft position, as is discussed below in greater detail. This arrangement permits the pressure and the timing and duration of injection to be varied independently of each other, even though they are coordinated together by ECU 18.

Fuel is supplied to pump 12 from a fuel supply system that includes a fuel tank 26, a fuel screen 27, a fuel filter 28, and a low pressure fuel pump 30, each of which can be conventional components. Fuel is drawn from fuel tank 26 through filter 28 and supplied to a low pressure fuel line 32, to which the inlet of high pressure pump 12 is connected. A fuel supply pressure sensor 34 provides ECU 18 with a signal indicative of the pressure of fuel in fuel line 32. A fuel supply pressure regulator 36 is operated by ECU 18 to control the pressure in fuel line 32. Pressure regulator 22 adjusts the pressure in common rail 14 by dumping fuel back into fuel tank 26 through a return line 38. Likewise, fuel supply pressure regulator 36 dumps excess fuel from fuel line 32 back into fuel tank 26 through return line 38.

With continued reference to FIG. 1, ECU 18 monitors a plurality of engine and environmental conditions and, in real time, develops from these the desired profiles for the injection of fuel into each of the cylinders. ECU 18 outputs a low pressure control signal (LPCS) to fuel supply pressure regulator 36, a pressure control signal (PCS) to pressure regulator 22, and injection signals (INJ and INJ') to injectors 16 and 16', respectively. Injectors 16 and 16' are preferably solenoid operated hydraulic injectors; i.e., hydraulic injectors, each having a solenoid-operated valve located in the fuel flow path between the hydraulic injector and its corresponding fuel line. INJ and INJ' can then simply be pulse-width modulated signals, in which case the timing of injection is the beginning of the pulse and the duration of injection is the width of the pulse.

For some engines, ECU 18 requires four basic inputs: load, engine speed, crankshaft position and sequence position. Although ECU 18 preferably includes other inputs described below, these fundamental inputs are necessary for the engine to operate.

Figure 2:
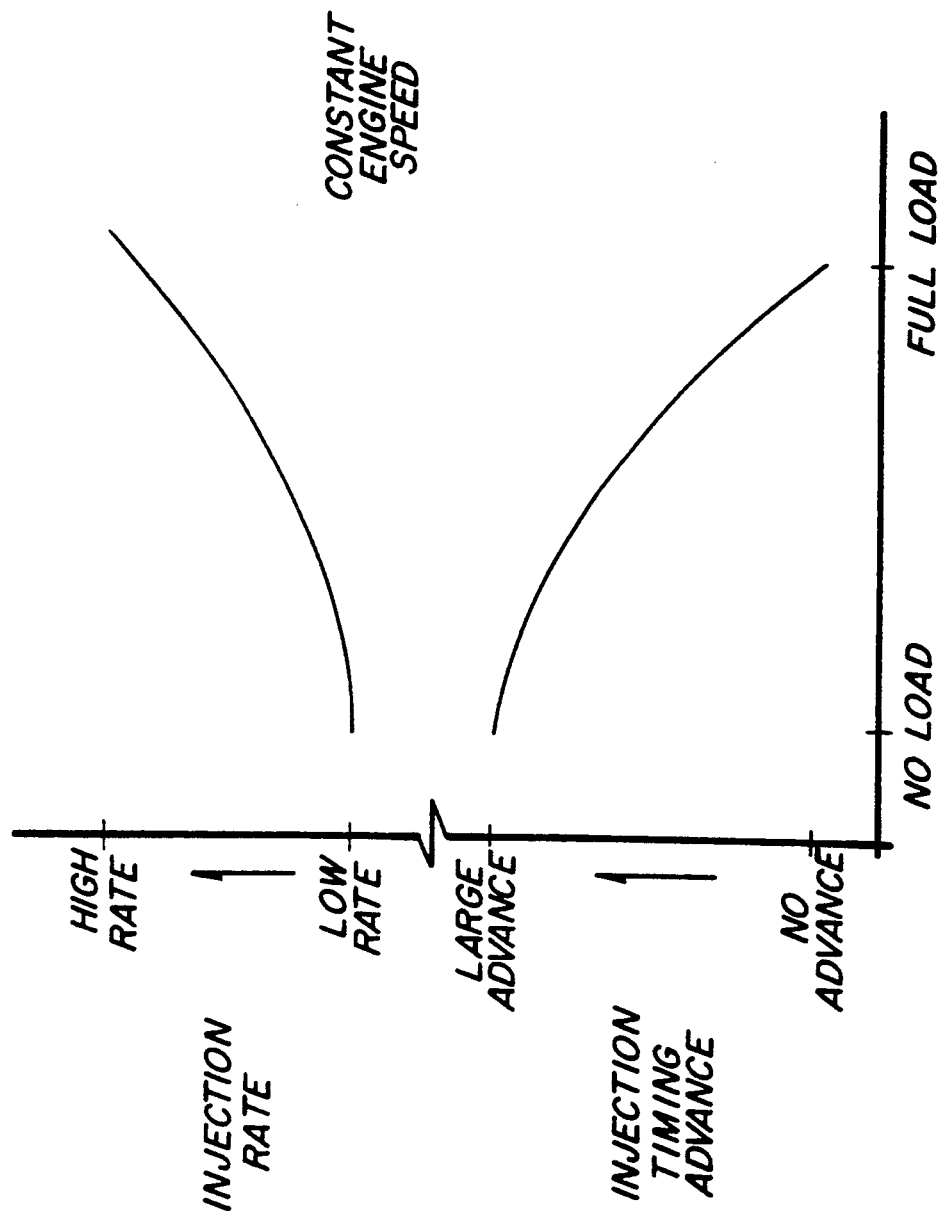
FIG. 2 is a graph indicating desirable relationships of load (e.g., accelerator position) to injection timing advance and injection rate at constant speed.

A signal indicative of the accelerator position is typically used as a measure of load, although, in the broader aspects of the invention, the load can be taken to be the position of any control mechanism (e.g., pedal, lever, governor, rack) used to control the engine output. Load is used by ECU 18 to control the pressure in common rail 14 and the timing and duration of injection into cylinders 20 and 20'. As shown in FIG. 2, for any value of engine speed, it is generally desirable to advance the beginning of injection (i.e., injection timing advance) as the load decreases. This is done because at lighter loads the cylinder temperature is lower and the combustion delay time is therefore longer. In order to avoid an excessive amount of fuel being injected into the cylinder during the delay period prior to ignition, advance of injection at lighter loads is preferably accompanied by a reduction in injection rate, which can be accomplished by reducing the common rail pressure.

Engine speed is also used to vary both the common rail pressure and the timing and duration of injection. For any load, the fuel quantity is varied proportionally to engine speed. As will be appreciated by those skilled in the art, fuel quantity can be varied by controlling the common rail pressure and the duration of injection, both of which can be independently adjusted. For example, a greater fuel quantity can be provided by either increasing the pressure of common rail 14 or increasing the duration of injection, or both. The beginning of injection is preferably advanced in direct, but not necessarily linear, proportion to engine speed to compensate for the real-time effects of delay time and combustion velocity.

Crankshaft position is used by ECU 18 as an indication of piston top dead center (TDC) for each cylinder. As is known, crankshaft position can be determined using a trigger wheel mounted on the crankshaft, with teeth that magnetically couple to a stationary pickup sensor as the crankshaft rotates. Of course, crankshaft position as an indication of piston TDC can be determined by monitoring the angular position of other shafts driven by the crankshaft, such as a camshaft. The timing and duration of injection for each cylinder is set in accordance with crankshaft position, as is described below in conjunction with FIG. 3.

Sequence position is used by ECU 18 to determine which of the cylinders is to receive the next injection of fuel in accordance with a pre-determined firing order. As will be appreciated by those skilled in the art, sequence position can be determined from the crankshaft position or a separate sensor located on either the crankshaft or a camshaft, depending upon the design of the engine.

Preferably, ECU 18 also receives the following inputs: common rail 14 fuel pressure, manifold absolute pressure, air temperature, fuel temperature, and engine coolant temperature. Additionally, ECU 18 preferably determines the rate of change of the measured load and uses it as another input in determining the desired pressure, timing, and duration of injection during transient operation.

The fuel pressure input is used to provide closed loop control via pressure regulator 22. ECU 18 can compare the desired pressure represented by PCS with the measured pressure to account for fuel system problems, such as a clogged fuel filter or damaged fuel pump, that result in the pressure of common rail 14 being different than the pressure commanded by ECU 18 via pressure regulator 22. ECU 18 could then vary the timing and duration of injection to, for instance, limit engine speed rather than sacrifice emissions quality. Also, ECU could alert the operator via a warning light or otherwise.

The manifold absolute pressure is used by ECU 18 to compensate for barometric pressure, altitude, and boost pressures on "charged" engines. Preferably, the rail pressure is increased and the timing is retarded in direct relationship with the manifold absolute pressure. On turbocharged engines, it is used to compensate for the turbocharger time lag during instances of quick load increases to thereby control the power output, noise, and emissions ($NO_x$, HC, particulates, and smoke). In particular, it is used with turbocharged engines for the purpose of avoiding smoke puffs that could occur since the engine "load," which in this case is determined by the air charge or turbocharger discharge pressure, increases due to turbo lag at a rate that can be much slower than the rate at which the accelerator is depressed.

Air temperature is used primarily to adjust the fuel quantity and timing of injection to compensate for air density changes. With increasing air temperature (i.e., decreasing air density), the fuel chemical delay time is reduced and, preferably, the timing is therefore retarded. Since the timing is retarded, the duration of injection is preferably reduced, both to match the lesser mass of air and to avoid a late ending of injection which would otherwise tend to increase smoke, particulate, and $NO_x$ emissions. The fuel pressure in common rail 14 could be reduced rather than, or in addition to, reducing the duration of injection. During starting, it is advantageous to advance the timing in inverse proportion to air temperature to allow more real-time exposure of the fuel to the air temperature conditions within the cylinder. This helps avoid misfiring by assuring ignition before the piston reaches TDC and the air charge cools down.

Fuel temperature can be used by ECU 18 to compensate for fuel density changes and the possible effects of fuel temperature on ignitability of the fuel. As fuel temperature increases, the common rail pressure and the duration of injection, or both, can be increased and the timing of injection can be retarded.

Engine coolant temperature is used to vary the fuel quantity and timing of injection. At lower coolant temperatures, the fuel quantity is increased and injection is advanced, especially for cold starting of the engine. Fuel quantity can be increased by increasing the duration of injection, but is preferably increased by increasing the common rail pressure, which will improve atomization of the fuel and reduce smoke typically caused by misfiring and excessive injection durations. This use of the coolant temperature by ECU 18 permits compensation for the combustion kinetics of a cold combustion chamber, as well as for the increased engine friction due to cold coolant and, presumably, oil.

The rate of change of the load computed by ECU 18 is used to modulate changes to fuel quantity and injection timing during quick transients to avoid misfiring and excessive noise and emissions of smoke, HC, and $NO_x$.

Each of the foregoing inputs are provided to ECU 18 by way of suitable sensors. The sensors are shown in FIG. 1 and are designated as follows: load sensor 40, engine speed sensor 42, crankshaft position sensor 44, camshaft position sensor 46, manifold pressure sensor 48, air temperature sensor 50, fuel temperature sensor 52, and coolant temperature sensor 54. The electrical lines running to and from ECU 18 to various components attached to common rail 14, fuel line 32, and injectors 16 and 16' are shown with a schematic representation of a coil to indicate that they are electrical rather than fuel lines.

In addition to using the foregoing inputs to adjust the common rail fuel pressure, ECU 18 also preferably operates to control pressure regulator 36 in accordance with low pressure sensor 34. Pressure sensor 34 can also be used to detect fuel pressure problems in low pressure fuel line 32 and to thereafter alert the operator. Moreover, control of the fuel supply system pressure (i.e., the pressure in fuel line 32) can be used to extend the dynamic pressure range of the high pressure common rail 14.

The specific relationships between the inputs discussed above and the injection and pressure control signals generated by ECU 18 will of course be particular to the performance requirements of the particular engine in which fuel injection system 10 is used. The programming of ECU 18 necessary to generate the injection and pressure control signals in accordance with the sensor inputs to ECU 18 is well within the level of skill in the art. Likewise, as briefly described above, the influence on engine performance of the various engine and environmental conditions, as well as the desired adjustments to fuel quantity, timing, and duration of injection to account for these conditions, are known to those skilled in the art and are therefore not elaborated upon here. However, for the purpose of exemplifying certain advantages of fuel system 10, FIG. 3 is provided to depict the desired direction of change of common rail pressure and the timing and duration of injection as a function of the basic engine conditions of speed, load, and crankshaft position.

Figure 3:
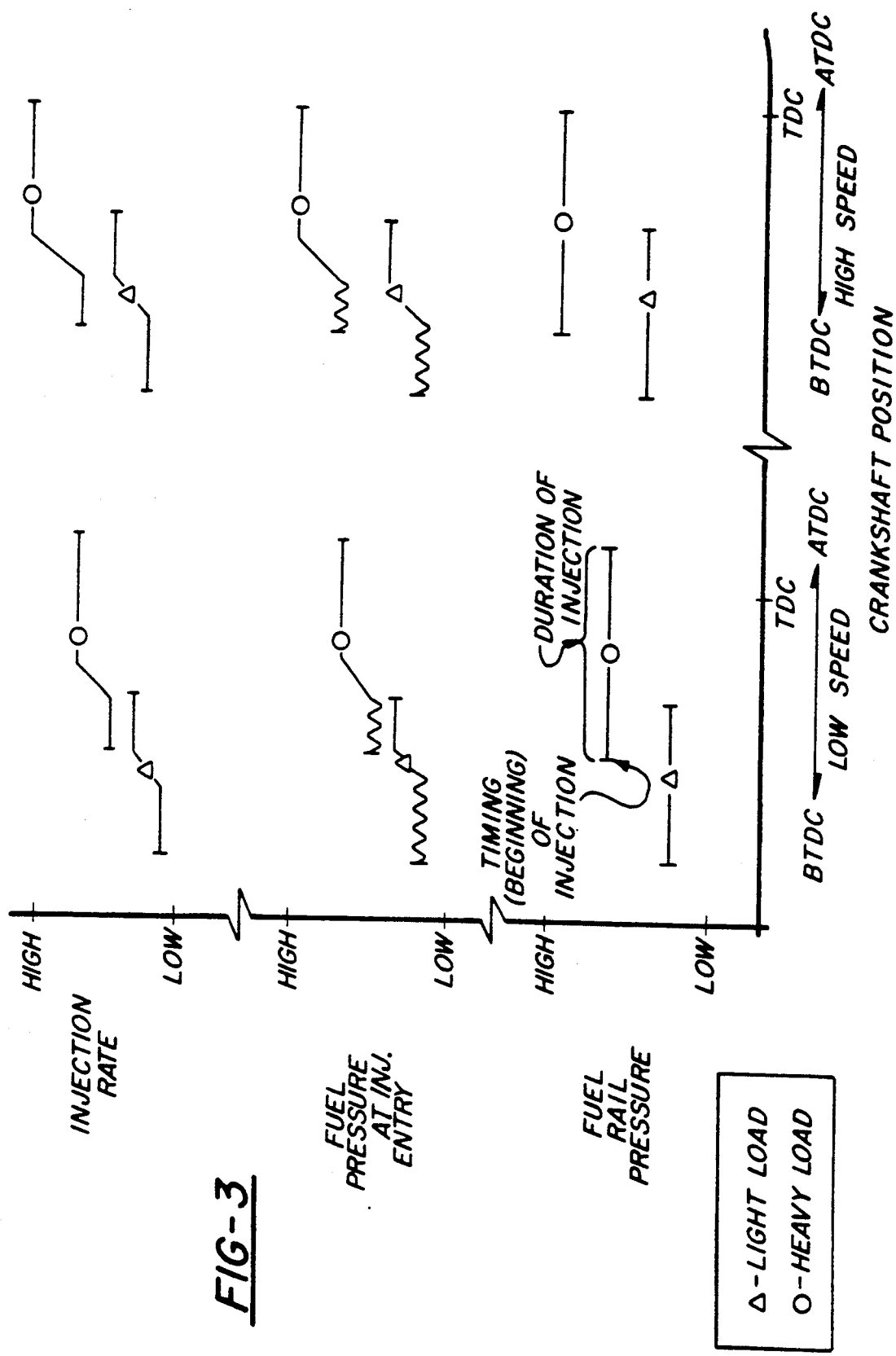
FIG. 3 is a graph showing a desirable relationship between injection (i.e., timing and duration of injection) and fuel rail pressure, fuel pressure at the injector tip, and injection rate for both low and high engine speeds at both low and high engine loads.

Referring now to FIG. 3, there is shown in diagrammatic form a profile of the common rail pressure and injection timing and duration based upon the engine load, engine speed, and crankshaft position inputs. This profile can be used to achieve a desirable engine performance that minimizes emissions. The profile could be stored in ECU 18 in the form of look-up tables or equations, or some combination thereof. In particular, fuel rail pressure, fuel pressure at the injector entry, and injection rate have been plotted along the Y-axis as a function of crankshaft (i.e., piston) position and engine speed, which have been plotted along the X-axis for both light and heavy loads. Crankshaft position along the X-axis has been designated as extending from before top dead center (BTDC) to after top dead center (ATDC).

Several relationships between the various inputs and the desired common rail pressure and the desired timing and duration of injection are evident by this figure. Injection is advanced for light loads (indicated by $\Delta$) with respect to heavy loads (indicated by $\bigcirc$), especially at lower engine speeds. For heavier loads, injection is advanced more for high engine speeds than for low speeds. The common rail pressure and duration of injection are higher for heavier loads than for lighter loads to increase the quantity of fuel injected. The common rail pressure is also increased for higher engine speeds.

Sometimes it is desirable to vary the rate of injection into the cylinder over the course of a single injection rather than only from one injection to another. In particular, it is often desirable to inject fuel at a reduced rate during the chemical delay period (i.e., early in the injection period) and then increase the rate of injection during combustion. The variable injection rate shown in FIG. 3 depicts one such possible profile. Since injection is controlled by injectors 16 and 16', rather than by pump 12, the stroke of pump 12 need not be timed with the injection of fuel into cylinders 20 and 20'. Thus, pump 12 is not used to vary the rate of injection over the course of injection, as is done in many prior art fuel injection systems. Rather, using solenoid operated fuel injectors, control of the injection rate can be provided by pulsing the fuel injector quickly and as many times as is desirable, or possible, resulting in pressure at injector entry having somewhat of a sawtooth waveform, as shown in FIG. 3. The average rate of injection is dependent on the width and frequency of the pulses. When pulsing the injector in this manner, it is preferable to maintain a continuous flow of fuel out of the injector nozzle to avoid the problem of improper atomization of the fuel which normally occurs during full closure of the injector. This can be accomplished by keeping the spacing (time) between the pulses small enough that the injector does not completely close.

This pulsing feature can be particularly important with dual-fuel engines when operating with gaseous fuel as the main source of energy and pilot liquid fuel for ignition. With current technology pump-line-and-nozzle systems, the quantity of pilot fuel remains constant regardless of the engine load, and the engine load demands are met by varying the quantity of gaseous fuel. In theory, operation with as little liquid fuel as possible is desired (nominally 5% of the total energy input to the engine is representative of the best efforts to date), since diesel fuel, in an energy-based cost ratio, is very expensive compared to natural gas (both diesel fuel and natural gas typically being the "liquid" and "gaseous" fuels of choice today). One system that is able to hold the 5% ratio of diesel to total energy input is the Cooper-Bessemer system, which, based on its pressure controls, can adjust diesel fuel delivery to the different amounts of natural gas demanded as engine power outputs (loads) change. Other systems, which are based on pump-line and hydraulic nozzles, may hold close to the 5% ratio at full load, but may go to levels as high as 20% or 30% when the load is reduced, since the quantity of diesel fuel remains fixed while the gas is reduced to satisfy the lower loads. Under these conditions, engine operation, due to total fuel costs alone, becomes very costly. The reason that the pump-line-and-nozzle systems cannot reduce the diesel fuel quantities below 5% of full load is because the pumping and metering at such low rates becomes nearly impossible, since the dynamic range of such fuel systems cannot reach so fast as to cover such minute amounts of fuel-per-injection. These fuel systems are made very large so that they can handle 100% delivery when operating as pure diesels; however, when their delivery is cut back to pilot fuel levels, they become erratic at best. High pressure line dynamics become a factor and many systems in fact cannot reach the 5% goal and must resign themselves to 7% or 10%, running the fuel costs of such engines to uncompetitive levels. It is believed that proper ignition of the main gas charge could be accomplished by pilot quantities of less than 5% and that even the Cooper-Bessemer system could do better but for the many necessary mechanical adjustments which dictate the 5% level from a practical, rather than a purely theoretical basis.

With the pulsing injector characteristics built into the fuel system herein described, consistent, repeatable operation, cylinder-to-cylinder and as a function of time should be possible regardless of the engine load, because not only is the injector pulse-width and frequency variable, but the common-rail pressure can be varied as well. Under such low-flow conditions, the system would operate at even lower flows than those shown schematically in FIG. 3. These lower flows could be accomplished by, for example, reducing the frequency of the pulses operating the injector with the system pressure being set at its minimum. By suitable control of the timing and duration of injection, one can achieve very smooth and quiet ignition at a low fuel rate, regardless of the engine's load.

This pulsing feature can be extremely important during cold start for smaller truck and industrial engines where such conditions and requirements are critical. The beginning of injection for such engines must be advanced, because the compression temperatures under such conditions are lower than under normal running (or starting) temperatures, and the fuel therefore needs more exposure time to the lower-than-normal compression temperature. This extra exposure time aids proper ignition because fuel auto-ignition is a time-temperature relationship. Lower temperature requires longer exposure time (time lag or chemical delay) Also, at lower temperatures, fuel atomization and evaporation is impaired. With conventional pump-line and nozzle systems, under cold cranking conditions of typically 100 to 200 rpm, injection is sluggish, because the pump's delivery rate as a time function is slow, partially due to the pump's internal leakage rates at such low rotational speeds. The net effect is that the pressure at the injector itself is low and, since the injector hole sizes are fixed, the atomization is very poor. One known way to improve the atomization and to increase the statistical chances of more fuel evaporating is to inject additional fuel, over and above the normal running quantities. However, the more fuel injected into the combustion chamber during the chemical delay period, the longer that period becomes, because the fuel is always (regardless of ambient or engine condition) colder than the compressed air near piston TDC. Since the heat of vaporization for the fuel is provided by compressed air, injection and evaporation of fuel results in a reduction in charge air temperature and an increase in chemical delay time. Moreover, the beginning of combustion becomes more violent and noisy due to the large amount of fuel injected during the chemical delay period. In some cases, this results in heavy black smoke puffs and associated gaseous emissions. This condition, for example, is typical of old and worn-out engines with high air-leakage paths through blow-by or poorly sealing valves.

With the fuel injection method of the present invention, the conditions described above can be controlled by raising the fuel pressure to improve atomization and mixing while reducing the pulse width and pulsing rate of the injection to concurrently achieve reduced fuel flow, resulting in reduced chemical delay time, faster and more positive (yet quieter and softer) starts with less smoke (black and/or white) and less of the particulates, aerosols, HC, CO and $NO_x$.

High pressure pump 12 can be any pump capable of providing fuel into common rail 14 at a pressure suitable to provide the needed quantity of fuel into cylinders 20 and 20' in the desired number of crankshaft degrees. Preferably, pump 12 pressurizes common rail 14 to between 2,000 and 20,000 psi. Even more preferably, the common rail pressure is maintained in the range of 4,000 to 16,000 psi.

Figure 4:
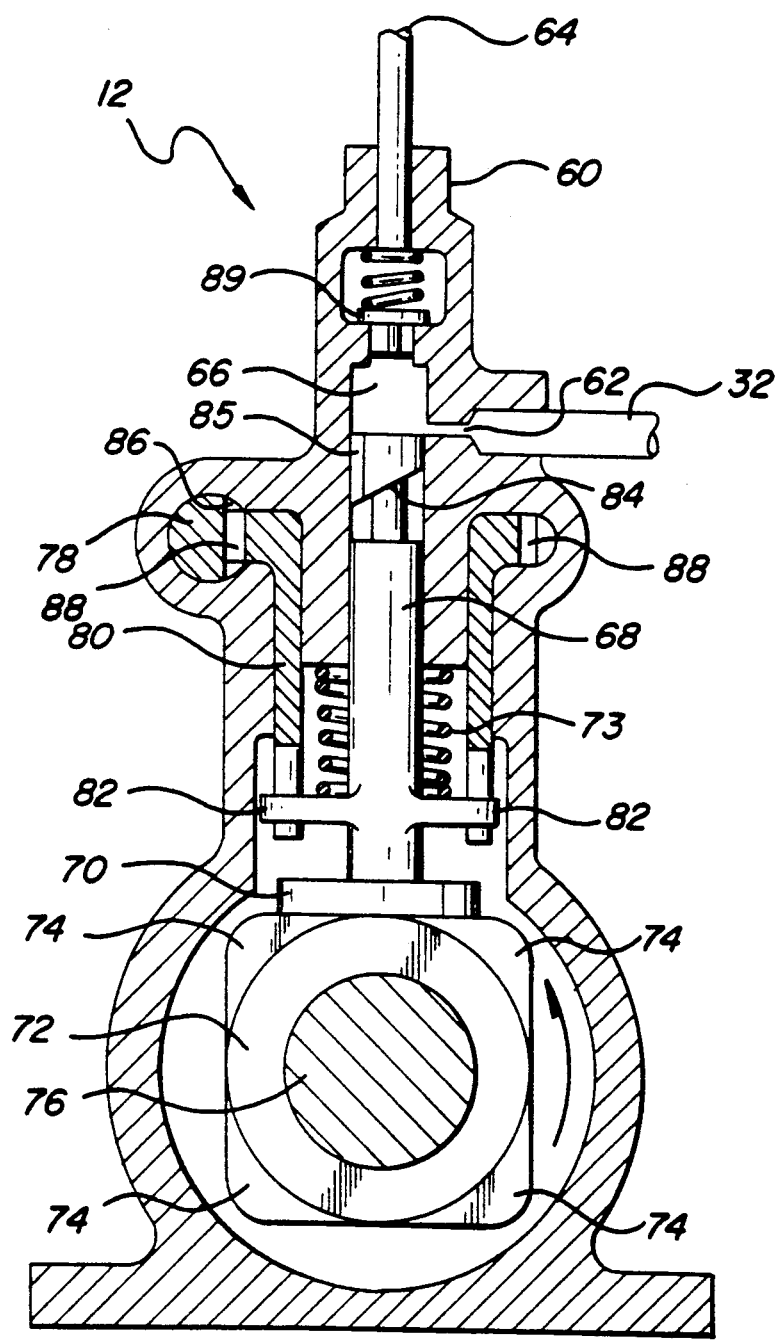
FIG. 4 is a sectional view of a high pressure pump suitable for use in the fuel injection system of FIG. 1.

FIG. 4 shows a preferred embodiment of pump 12 which comprises a modified version of what is commonly known as an in-line or jerk-type fuel pump. Pump 12 includes housing 60, an inlet 62, an outlet 64, a pumping chamber 66, a reciprocating-displacement plunger 68 having a cam follower 70, a cam 72 and a plunger return spring 73. Cam 72 preferably has a plurality of cam lobes 74 and is disposed on a camshaft 76 that is driven by the engine crankshaft. Cam follower 70 of plunger 68 is biased against cam 72 under the force of expansion of spring 73. Accordingly, as cam 72 rotates, lobes 74 engage spring-loaded cam follower 70, thereby causing reciprocating motion of plunger 68. By inspection of FIG. 4, it can be seen that upward movement of plunger 68 causes the top portion of plunger 68 to cover inlet 62 so that fuel located in pumping chamber 66 is forced into common rail 14 through outlet 64.

Since the pressure of common rail 14 is controlled by pressure regulator 22, pump 12 can be configured to continuously pump enough fuel to maintain the maximum common rail pressure required for the intended operation of fuel injection system 10. However, constantly running pump 12 at such a high pressure increases the wear of pump 12 and pressure regulator 22 and wastes engine horsepower. Thus, pump 12 preferably includes some means for varying the quantity of fuel pumped into common rail 14 to thereby provide a coarse adjustment of the pressure in common rail 14. If pump 12 of FIG. 4 is used as the high pressure pump, control of the quantity of fuel can be achieved by varying the effective pumping stroke of plunger 68. A common means for varying the quantity of fuel pumped is shown in FIG. 4 and includes a rack 78, a rotatable control sleeve 80, connecting links 82, and a helical groove 84 and vertical slot 85 formed in the top portion of plunger 68. Rack 78 has teeth 86 formed along its length that engage teeth 88 on control sleeve 80. Thus, linear movement of rack 78 along its axis results in rotation of control sleeve 80. Connecting links 82 are lateral extensions of plunger 68 and are connected to control sleeve 80 to cause plunger 68 to rotate with control sleeve 80. As is known by those skilled in the art, helical groove 84 and vertical slot 85 operate to provide a path between pumping chamber 66 and inlet 62 when helical groove 84 passes by inlet 62 during upward movement of plunger 68. The path established between pumping chamber 66 and inlet 62 operates to immediately drop the pressure in pumping chamber 66 to that of the supply pressure in low pressure supply line 32. This effect is commonly known as the "spill" function. The back pressure from common rail 14 closes a check valve 89 and the pumping stroke is thereby effectively stopped. By adjusting the position of rack 78, the angular position of control sleeve 80, plunger 68, and therefore, helical groove 84 is changed. This changes the point along the stroke of plunger 68 at which helical groove 84 passes inlet 62, thereby changing the effective stroke length and, consequently, the amount of fuel pumped during the stroke into common rail 14.

Rack 78 is coupled to the engine's accelerator (not shown) so that, as the accelerator is pressed, rack 78 moves to increase the quantity of fuel pumped into common rail 14. As previously mentioned, the position of the accelerator is taken by ECU 18 to be the load. Referring again briefly to FIG. 2, preferably the injection rate (i.e., common rail pressure) at no load (i.e., accelerator not pressed) is relatively low and, at full load (i.e., accelerator fully depressed), is relatively high. By using the accelerator to vary the amount of fuel pumped during each stroke of pump 12, the desired injection rate curve of FIG. 2 can be roughly provided by the accelerator and pump 12, with pressure regulator 22 only having to fine tune the pressure in common rail 14. With this arrangement load sensor 40 can be arranged to monitor the position of rack 78, as shown in FIG. 1.

Although only one cam lobe 74 is required to pump fuel into common rail 14, there are preferably enough cam lobes 74 to provide one stroke of plunger 68 for each injection of fuel, which, in most instances will mean one cam lobe for each injector. To help minimize pressure fluctuations, it is desirable to roughly time the pumping of fuel by pump 12 with the injection of fuel into cylinders 20 and 20'.

It should be noted that, in the broader aspects of the invention, any means for supplying fuel to common rail 14 at high pressure can be used. For example, a modified rotary type distributor pump could be used. However, since precise control of the pressure of common rail 14 and of the timing and duration of injection is achieved using ECU 18, a rotary type pump suitable for use with the present invention need only provide basic pumping functions. For example, since fuel is being pumped into a common rail, the distributing function and its associated into a common rail, the distributing function and its associated structure are not needed. Additionally, as can be seen by reference to the aforementioned U.S. Pat. No. 4,757,795, the contents of which are hereby incorporated by reference, the added complexity required of rotary pumps that control the timing and duration of injection can be eliminated, the only requirement being that the pump be able to maintain a sufficient supply of pressurized fuel in common rail 14. Consequently, regardless of the type of pumping element, governing systems common in mechanical pumps are not needed, since the functions performed by those systems can be performed in accordance with the present invention by electronically controlling the timing, duration, and quantity of fuel at any engine speed. As those skilled in the art will appreciate, precise torque shaping of a fuel delivery curve with the system herein described can be achieved by controlling the various control functions (pressure, timing, and duration) through simple electronic manipulation within ECU 18.

Referring again to FIG. 1, the internal diameter of injector lines 17 and 17' are preferably equal. It is also preferable to make injector lines 17 and 17' as short as possible and to make the internal diameter of common rail 14 larger than that of injector lines 17 and 17' to thereby provide an accumulator effect which reduces the flow restriction and the transient response time of the fuel.

Preferably, fuel injection system 10 further includes a mechanical pressure-relief valve 90 connected between common rail 14 and return line 38. Valve 90 limits the pressure in common rail 14 to protect against possible damage. For example, at engine shutdown, power to pressure regulator 22 and fuel injectors 16 and 16' is interrupted, thereby preventing removal of fuel from common rail 14 by those devices, while fuel pumping may continue into common rail 14 by pump 12 due to the engine coasting down. In that situation, valve 90 can protect the fuel system from excessive pressure by dumping fuel into fuel tank 26 via return line 38. Pressure-relief valve 90 can also be used to prevent build-up of excessive pressure following a hot shutdown, which, as is known by those skilled in the art, causes heating and, therefore expansion, of fuel trapped in common rail 14. Preferably, ECU 18, pressure regulator 22, and pressure sensor 24 14 are used in these situations to lower the pressure in common rail to below the nozzle opening pressure of the injectors. This insures that any fuel that may bleed through the solenoid (or other device controlling the flow of fuel through the injector) will not have sufficient pressure to open the injector and flood the cylinder. This can be done by programming ECU 18 to control regulator 22, using pressure sensor 24 for feedback, to dump fuel into fuel tank 26 through return line 38 until the pressure in common rail 14 is below (e.g., one-half) the nozzle opening pressure. This can be continued as long as the fuel temperature increases (and therefore, the fuel pressure increases), which can be monitored by ECU 18, using fuel temperature sensor 52.

One or more dampers 92 can also be provided at, for example, each end of common rail 14 to smooth out any pressure waves that may occur due to the operation of pump 12, injectors 16 and 16', pressure regulator 22, or otherwise.

It will thus be apparent that there has been provided in accordance with the present invention a method of fuel injection rate control which achieves the aims and advantages specified herein. It will of course be understood that the foregoing description is of preferred exemplary embodiments of the invention and that the invention is not limited to the specific embodiments shown. Various changes and modifications will become apparent to those skilled in the art and all such variations and modifications are intended to come within the spirit and scope of the appended claims.

What is claimed is:

1. A method for controlling the rate of injection of fuel from an electrically operated fuel injector switchable between an on position to provide a first condition of fuel injection operation and to an off position to provide a second condition of fuel injection operation and controlled by an electronic control unit for pulsing fuel into the combustion chamber of an internal combustion engine operable over a wide range of speeds and loads, comprising the steps of:

supplying pressurized fuel to the fuel inlet of said fuel injector; and switching said fuel injector alternately between the on and off positions at a predetermined rate by electric signals from said electronic control unit to thereby control the average rate of discharge of fuel from said fuel injector into said combustion chamber to optimize fuel combustion therein.

2. The method of claim 1, wherein said fuel injector is a solenoid operated injector responsive to the electrical signals and wherein said switching step further comprises:

operating said fuel injector with electrical pulses having a predetermined width and frequency.

3. The method of claim 2, wherein the frequency of said pulses is high enough to provide a continuous flow of fuel from said fuel injector.

4. The method of claim 2, further comprising the step of varying the width and frequency of said pulses.

5. The method of claim 4, further comprising the step of varying the width and frequency of said pulses over the course of a single injection.

* * * * *